United States Patent
Lee et al.

(10) Patent No.: US 10,611,342 B2
(45) Date of Patent: Apr. 7, 2020

(54) WINDSHIELD WIPER ASSEMBLY

(71) Applicants: ALBEREE PRODUCTS, INC., Halethorpe, MD (US); API KOREA CO., LTD., Incheon (KR)

(72) Inventors: Albert Lee, Baltimore, MD (US); Choon Bae Lee, Incheon (KR)

(73) Assignees: ALBEREE PRODUCTS, INC., Halethorpe, MD (US); API KOREA CO., LTD., Incheon (KR)

( * ) Notice: Subject to any disclaimer, the term of this patent is extended or adjusted under 35 U.S.C. 154(b) by 192 days.

(21) Appl. No.: 15/566,927

(22) PCT Filed: Apr. 15, 2016

(86) PCT No.: PCT/KR2016/003936
§ 371 (c)(1),
(2) Date: Oct. 16, 2017

(87) PCT Pub. No.: WO2016/167595
PCT Pub. Date: Oct. 20, 2016

(65) Prior Publication Data
US 2018/0126956 A1  May 10, 2018

(30) Foreign Application Priority Data
Apr. 17, 2015 (KR) ........................ 10-2015-0054738

(51) Int. Cl.
*B60S 1/38* (2006.01)
*B60S 1/52* (2006.01)

(52) U.S. Cl.
CPC ............. *B60S 1/381* (2013.01); *B60S 1/3851* (2013.01); *B60S 1/3887* (2013.01); *B60S 1/3891* (2013.01); *B60S 1/3894* (2013.01); *B60S 1/524* (2013.01)

(58) Field of Classification Search
CPC ............... B60S 1/40; B60S 1/38; B60S 1/381
See application file for complete search history.

(56) References Cited

U.S. PATENT DOCUMENTS

| | | | | |
|---|---|---|---|---|
| 2006/0026786 | A1* | 2/2006 | Ku ............................ | B60S 1/38 15/250.32 |
| 2006/0037167 | A1* | 2/2006 | Nacamuli ................. | B60S 1/38 15/250.201 |
| 2006/0179598 | A1 | 8/2006 | Leu | |
| 2011/0247167 | A1* | 10/2011 | Huang ................... | B60S 1/3881 15/250.32 |
| 2012/0297567 | A1* | 11/2012 | Hyer ...................... | B60S 1/3801 15/250.32 |
| 2014/0047661 | A1* | 2/2014 | Bousset .................. | B60S 1/524 15/250.04 |

(Continued)

FOREIGN PATENT DOCUMENTS

| | | |
|---|---|---|
| JP | 2006-290219 A | 10/2006 |
| JP | 2011-219088 A | 11/2011 |

*Primary Examiner* — Michael D Jennings
(74) *Attorney, Agent, or Firm* — Birch, Stewart, Kolasch & Birch, LLP

(57) ABSTRACT

Disclosed herein is a windshield wiper assembly that is capable of securely holding a spoiler, thereby preventing poor operation of a wiping rubber member. In the windshield wiper assembly, a base part, formed at one end of the spoiler to support the wiping rubber member, is inserted into an end cap through an outer plug.

22 Claims, 21 Drawing Sheets

(56) References Cited

U.S. PATENT DOCUMENTS

| | | | |
|---|---|---|---|
| 2015/0113755 A1* | 4/2015 | Cros | B06S 1/38 15/250.201 |
| 2015/0266453 A1* | 9/2015 | Park | B60S 1/3851 15/250.201 |
| 2015/0274128 A1* | 10/2015 | Avasiloaie | B60S 1/381 15/250.201 |

* cited by examiner

[Fig. 1]
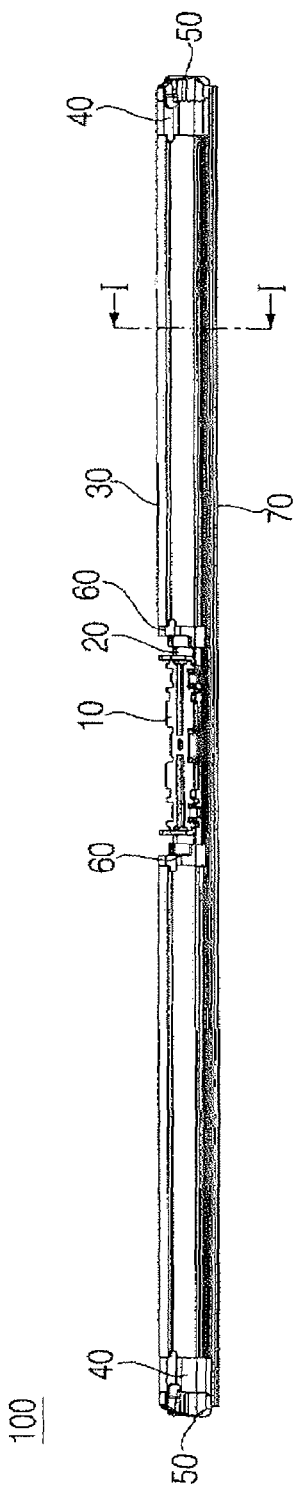

[Fig. 2]
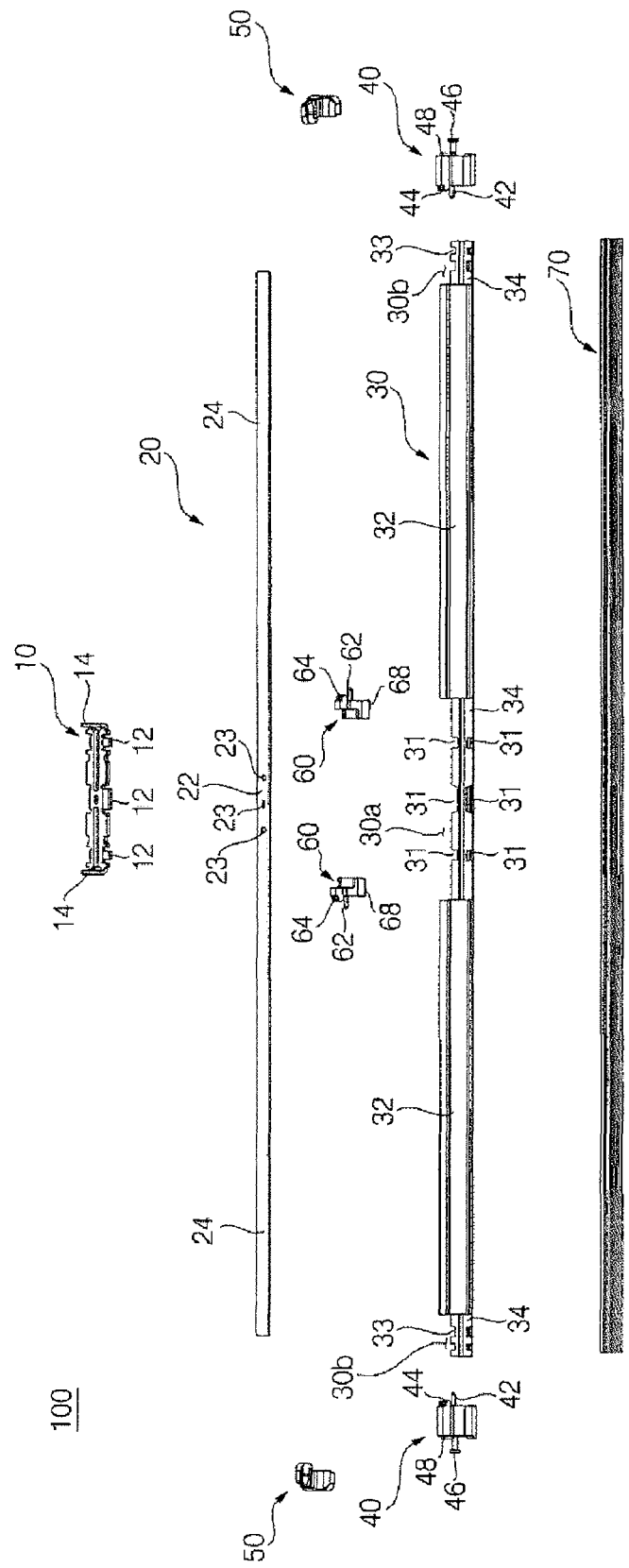

[Fig. 3]
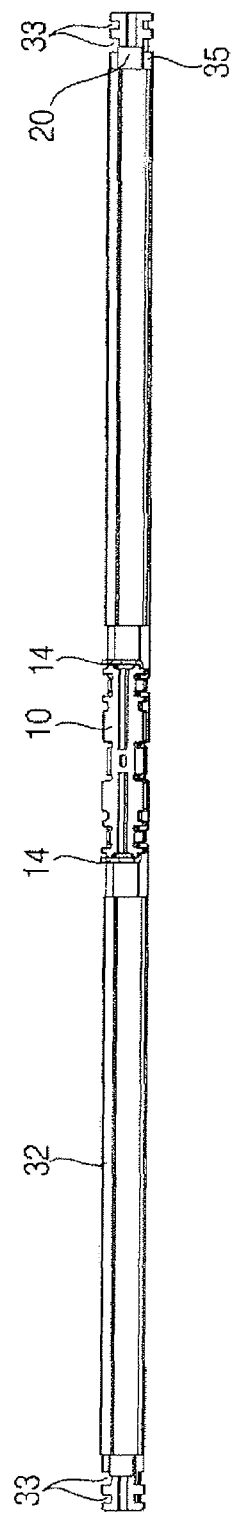

[Fig. 4]
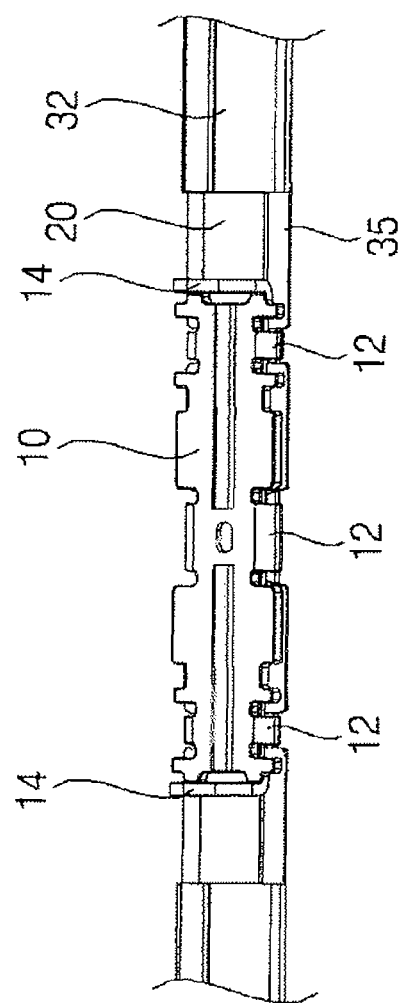
[Fig. 5]
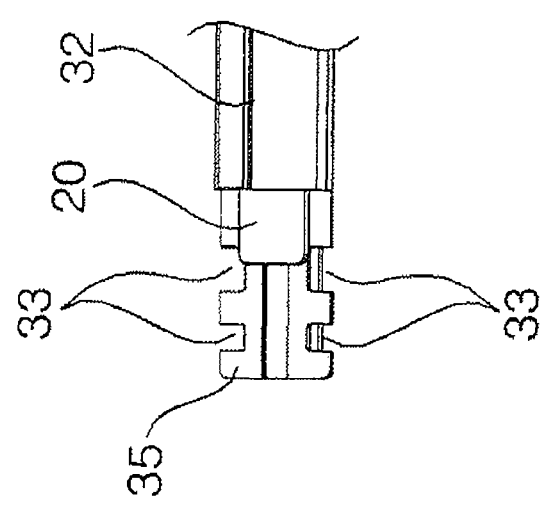

[Fig. 6]
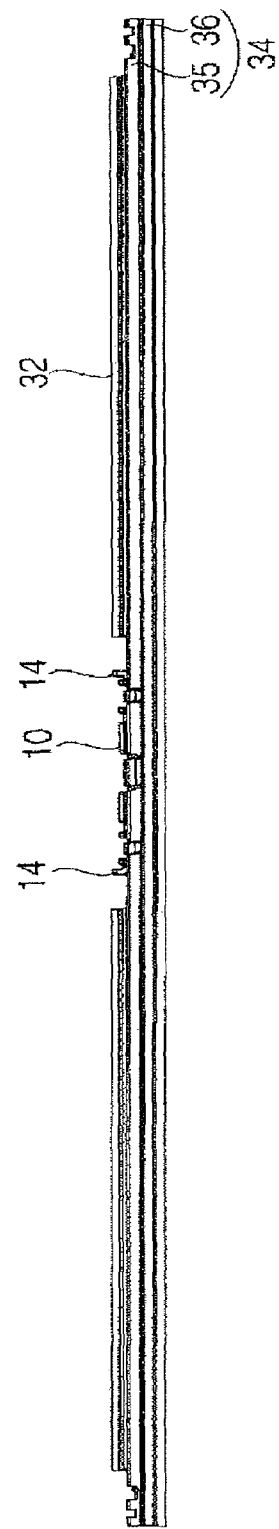

[Fig. 7]
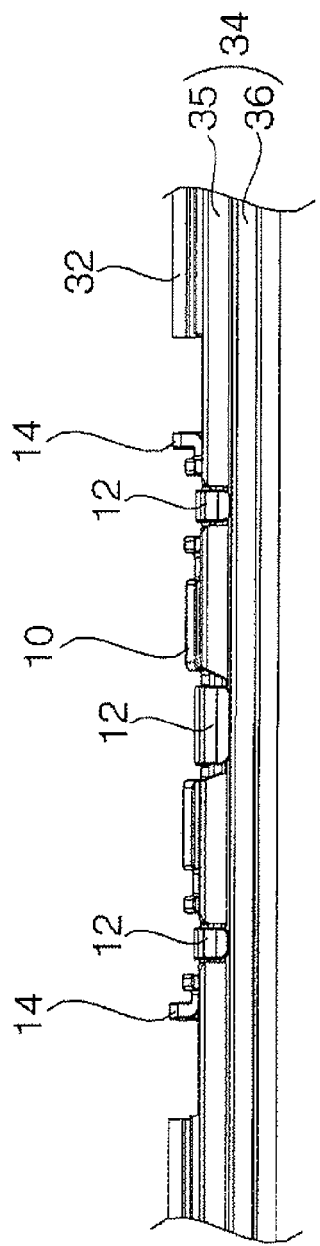

[Fig. 8a]
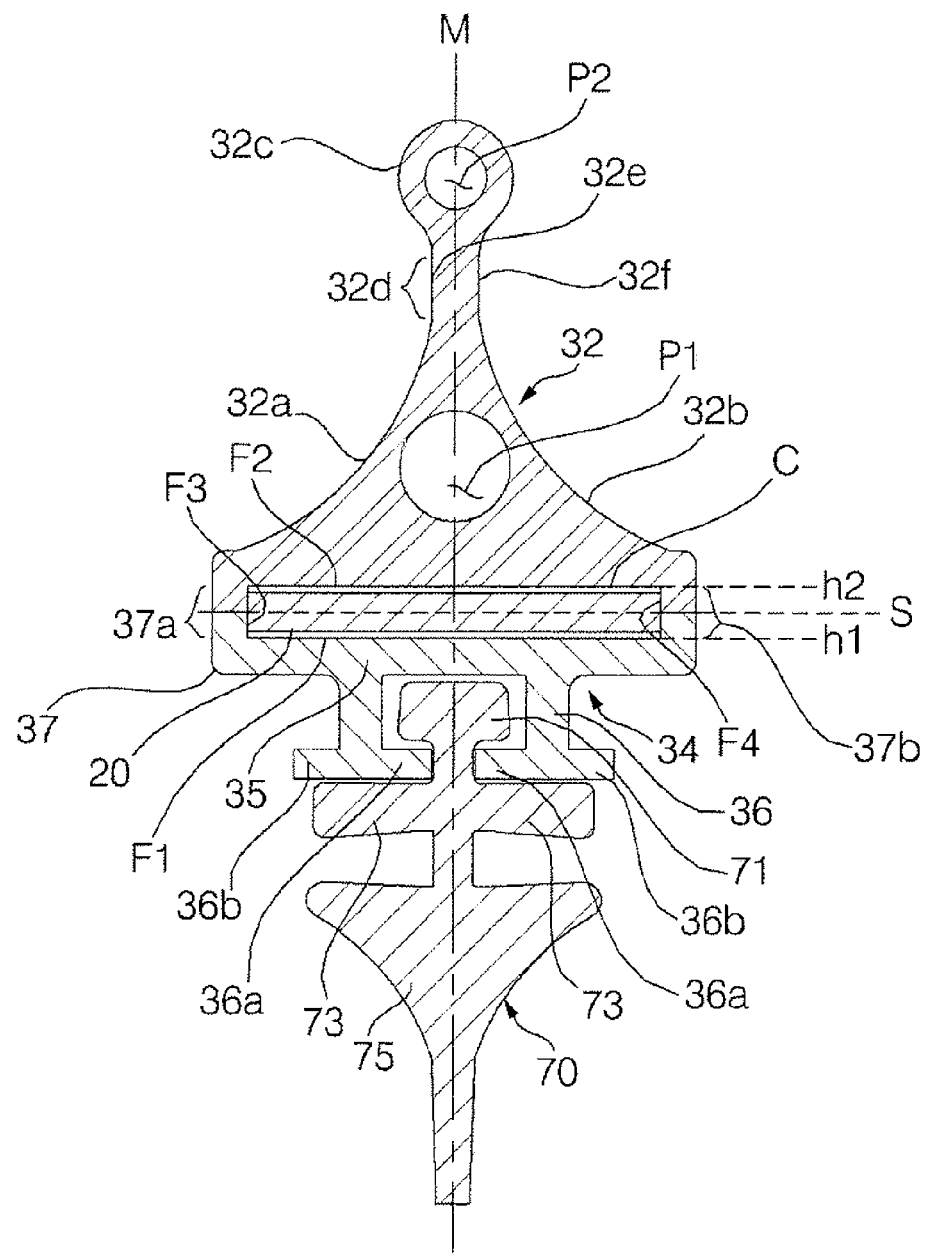

[Fig. 8b]
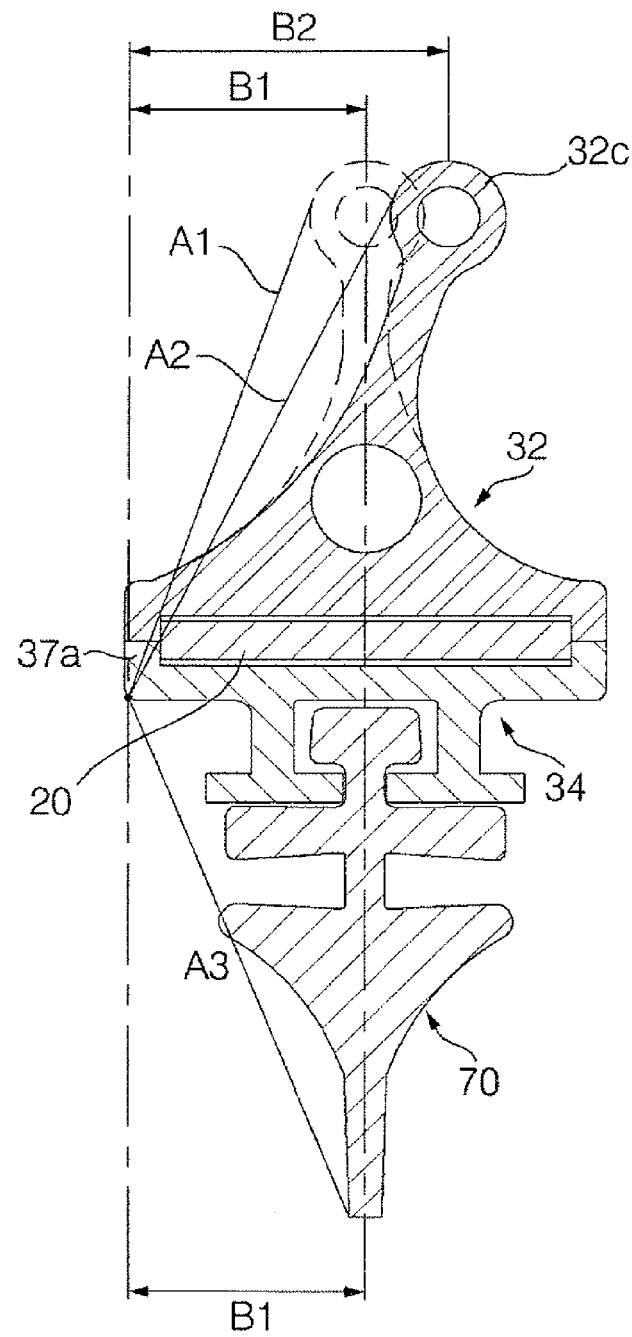

[Fig. 9]
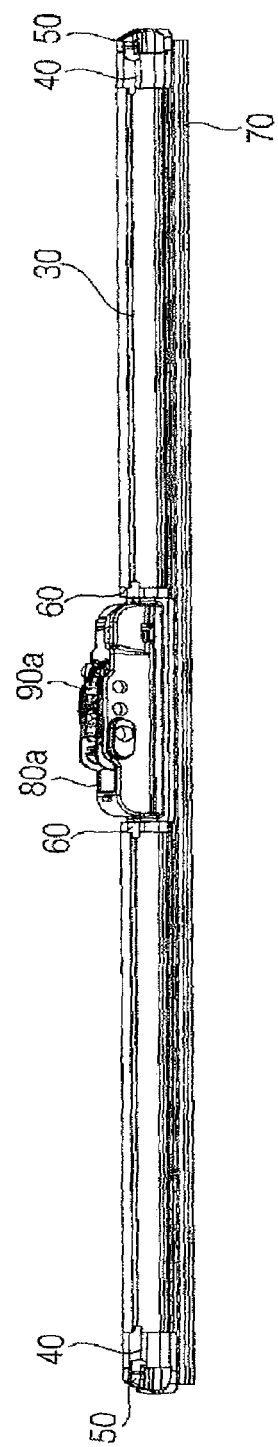

[Fig. 10]
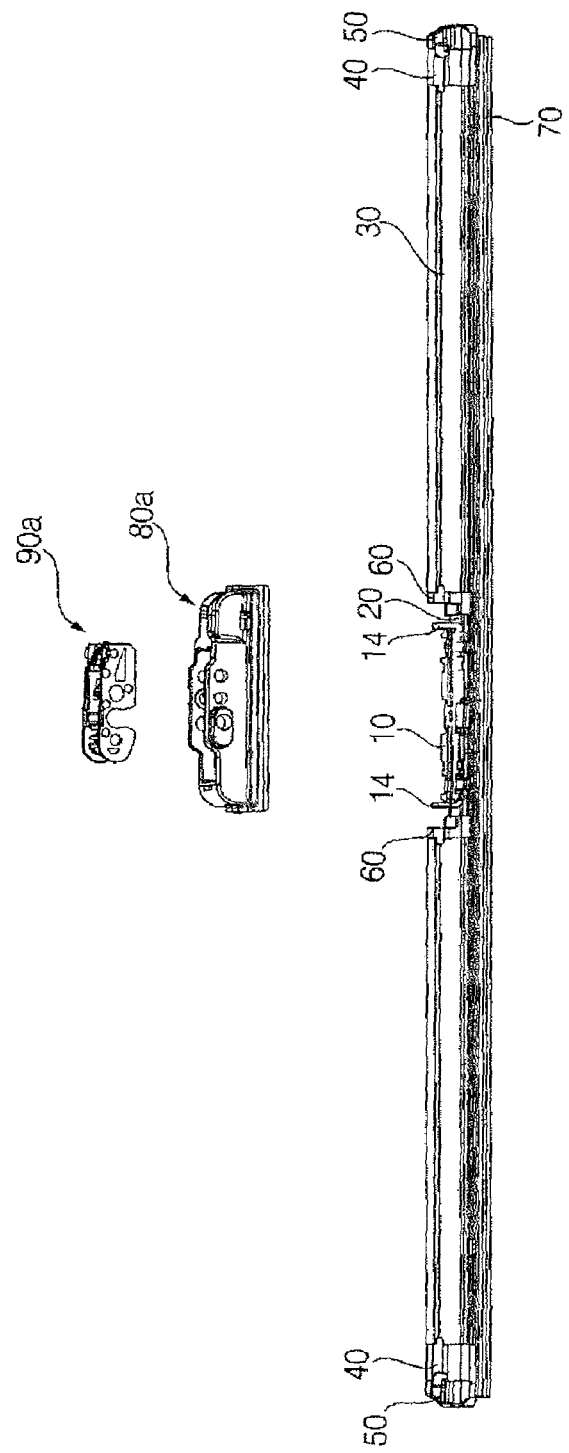

[Fig. 11]
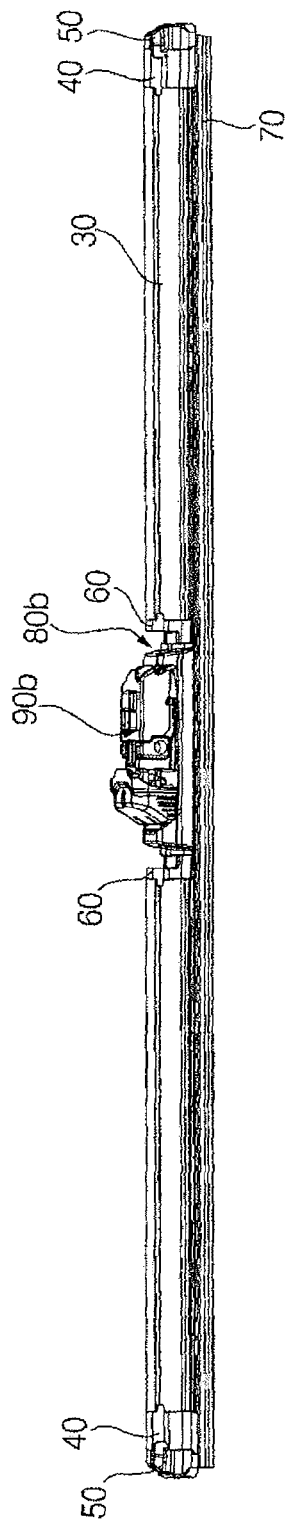

[Fig. 12]
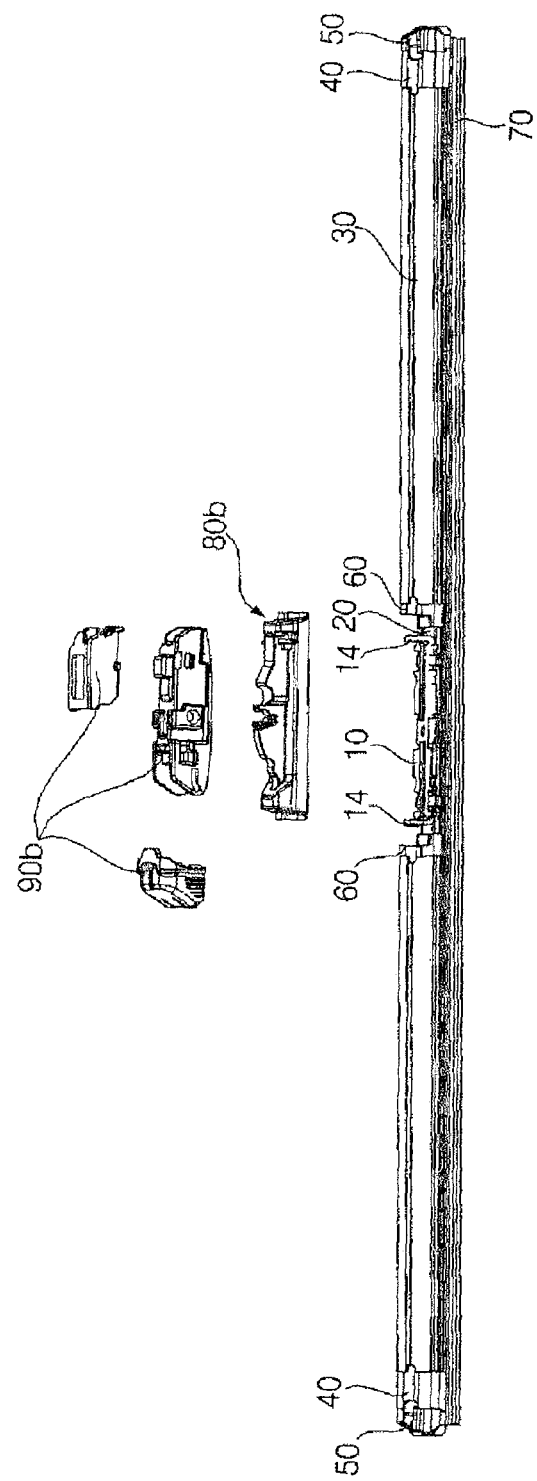

[Fig. 13]
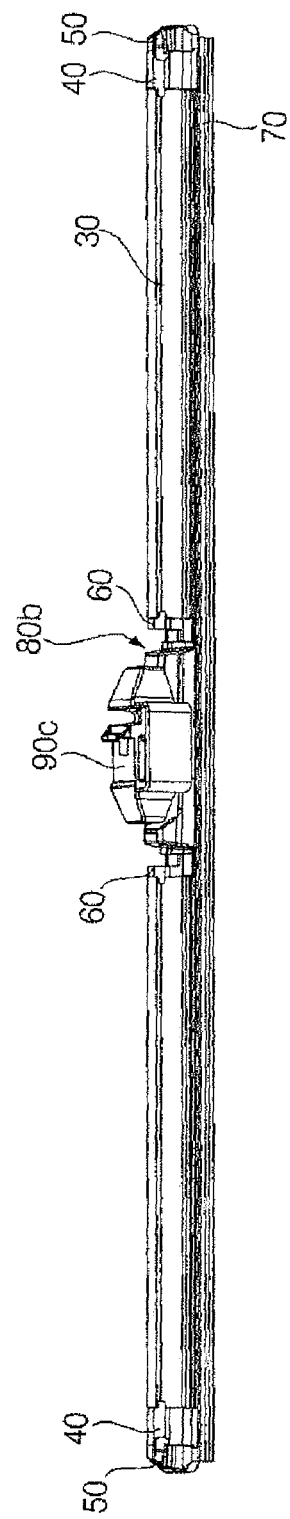

[Fig. 14]
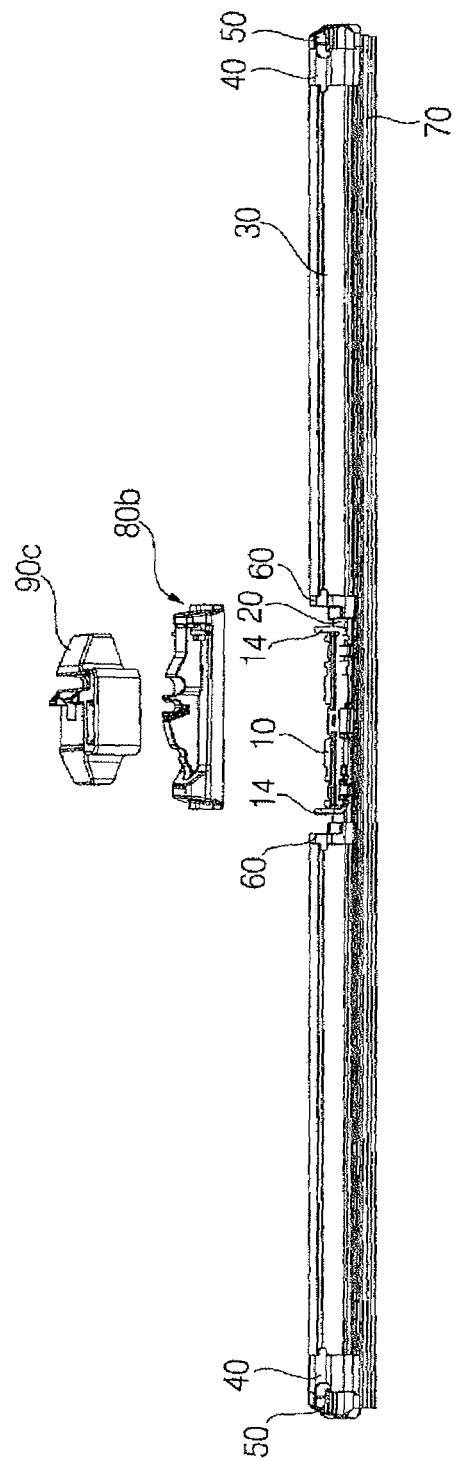

[Fig. 15a]
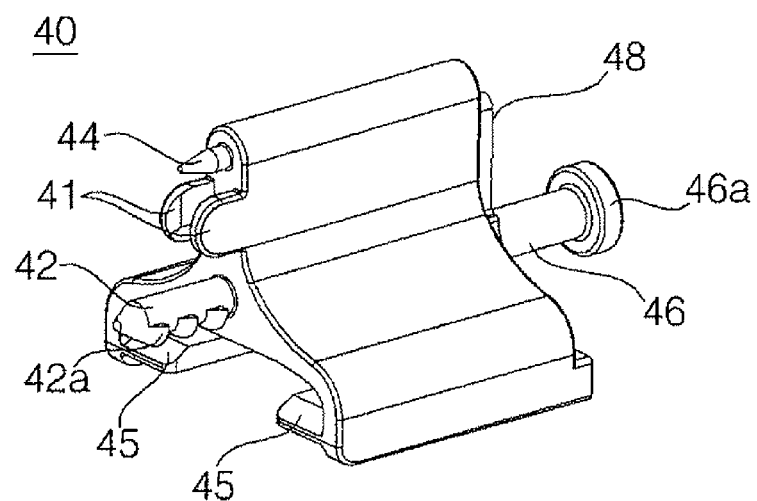
[Fig. 15b]
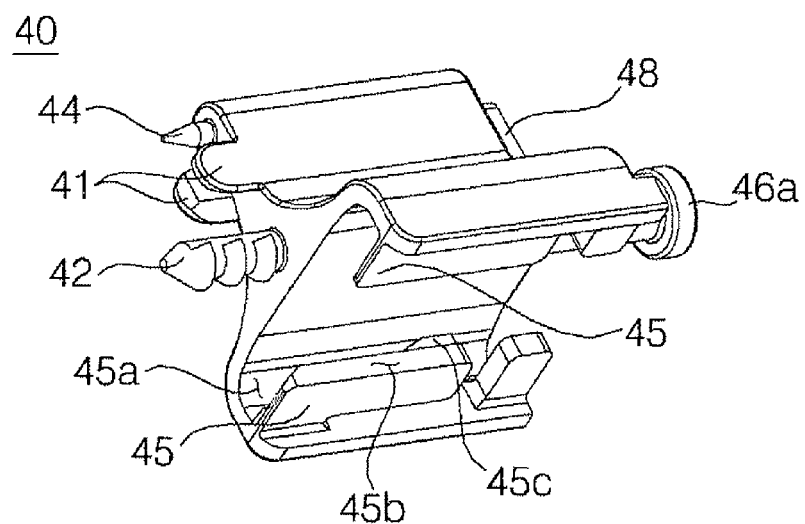

[Fig. 15c]
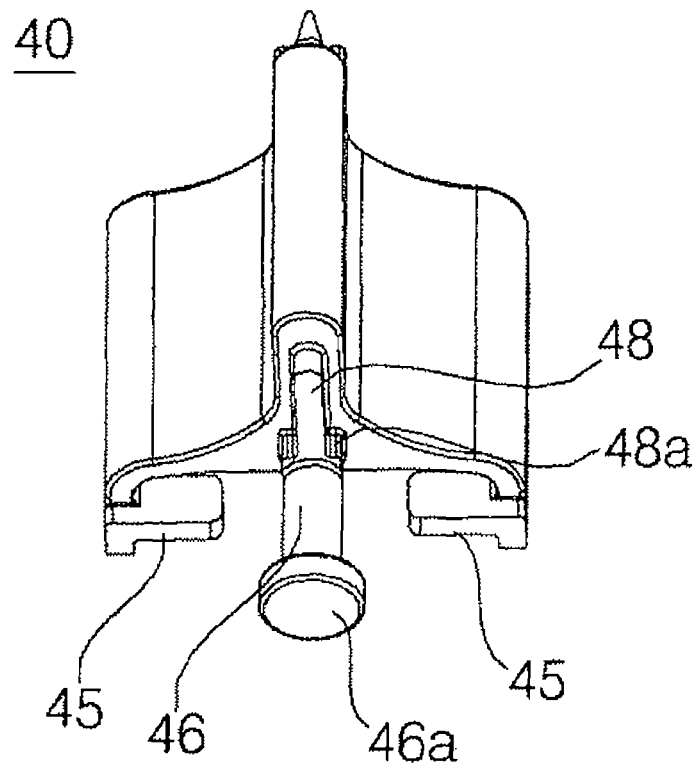
[Fig. 16a]
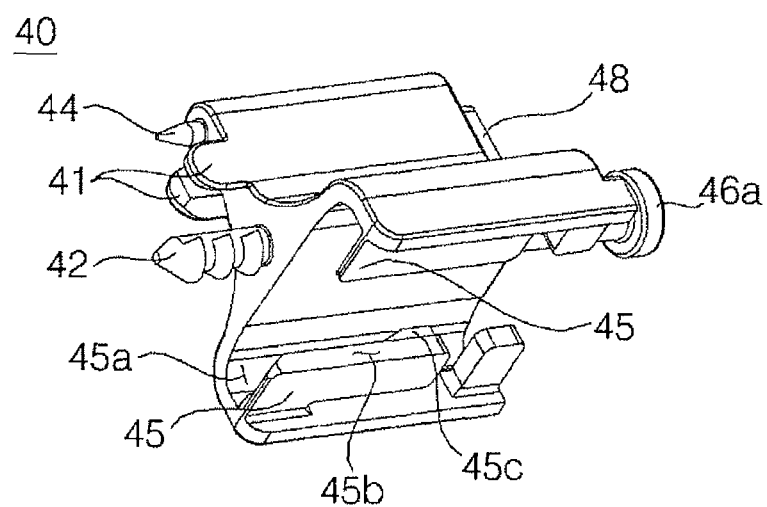

[Fig. 16b]
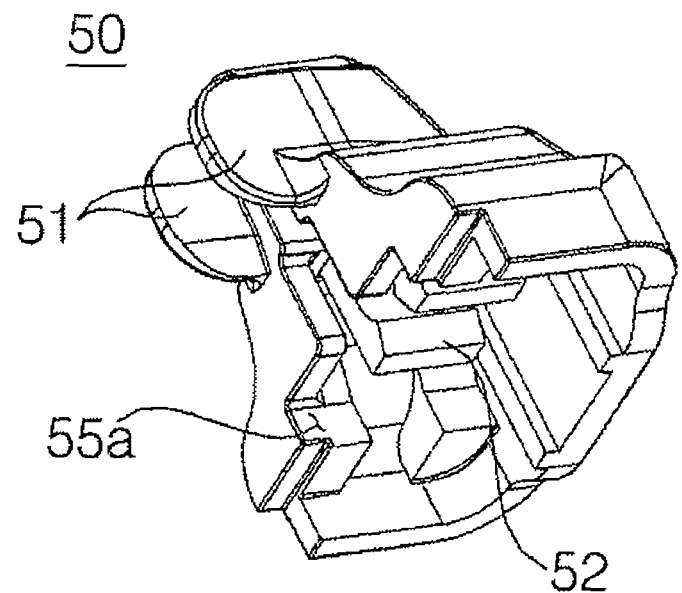
[Fig. 16c]
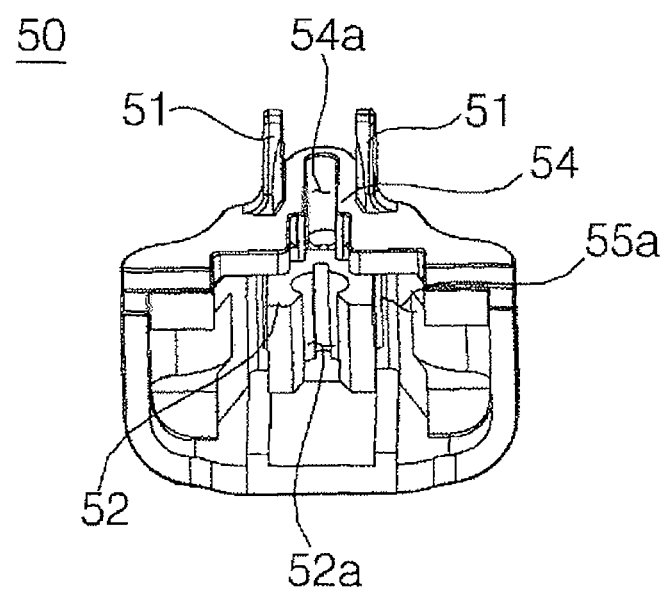

[Fig. 17a]
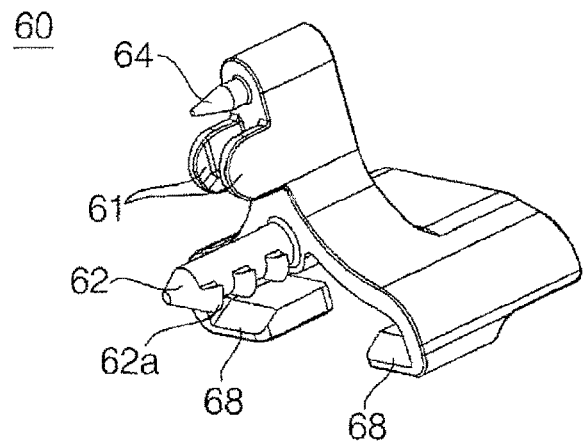
[Fig. 17b]
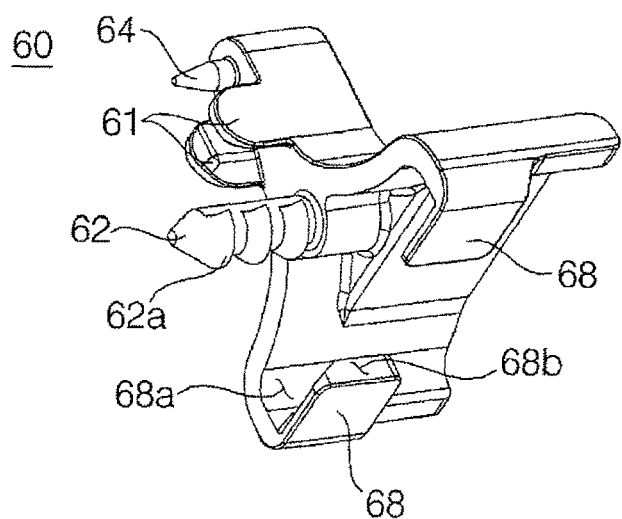
[Fig. 17c]
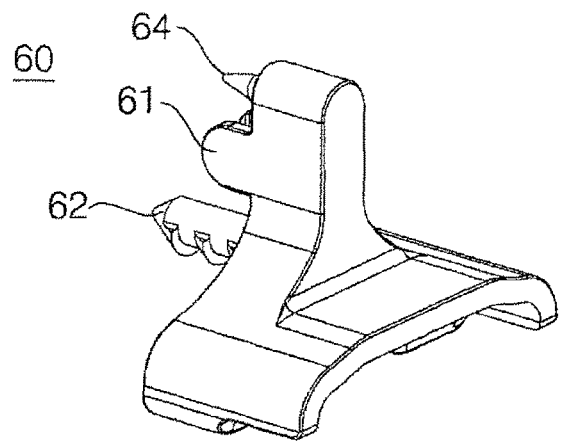

[Fig. 18]
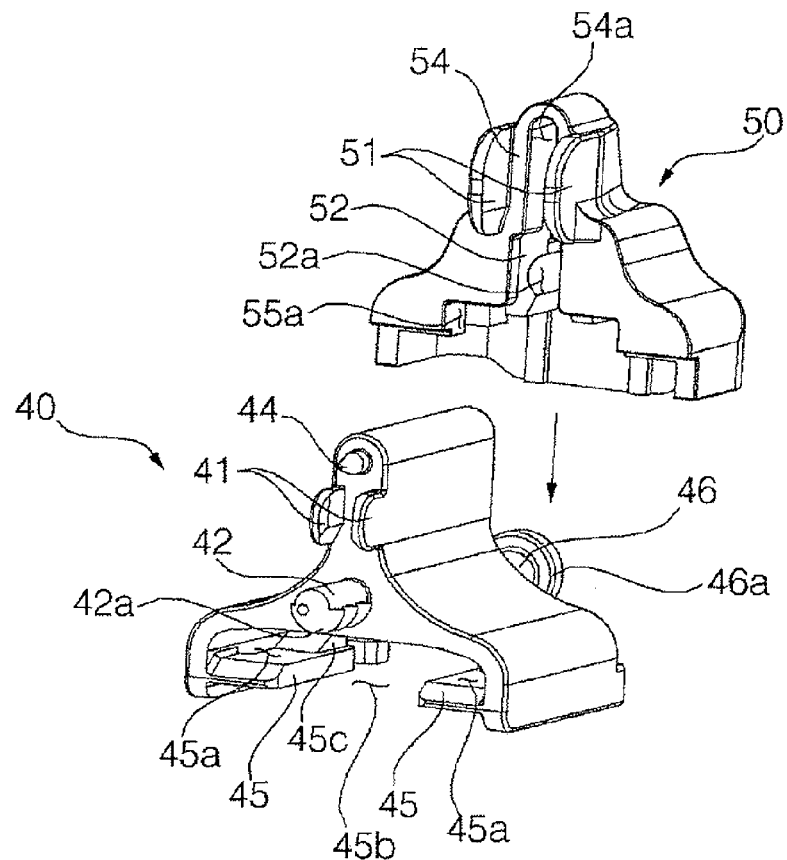
[Fig. 19a]
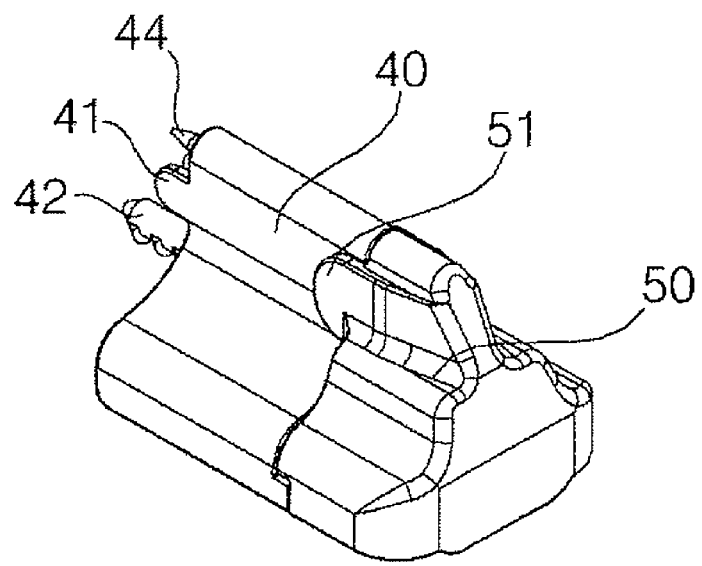

[Fig. 19b]
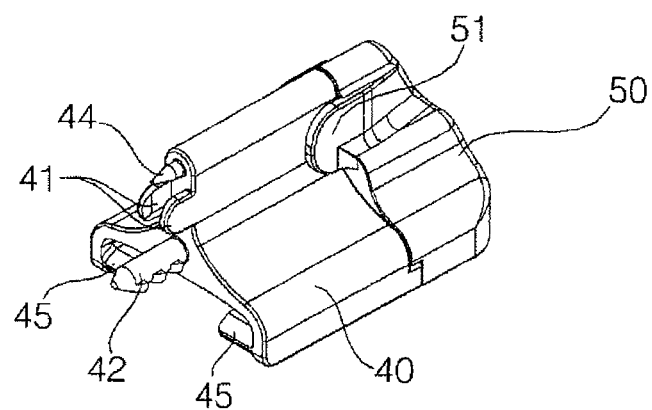
[Fig. 19c]
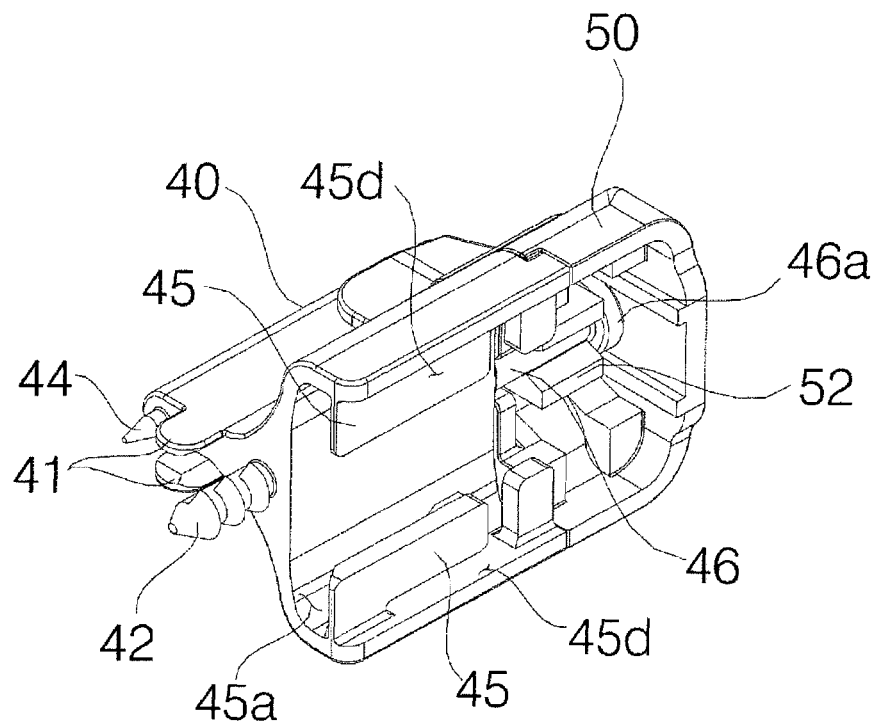

[Fig. 20]
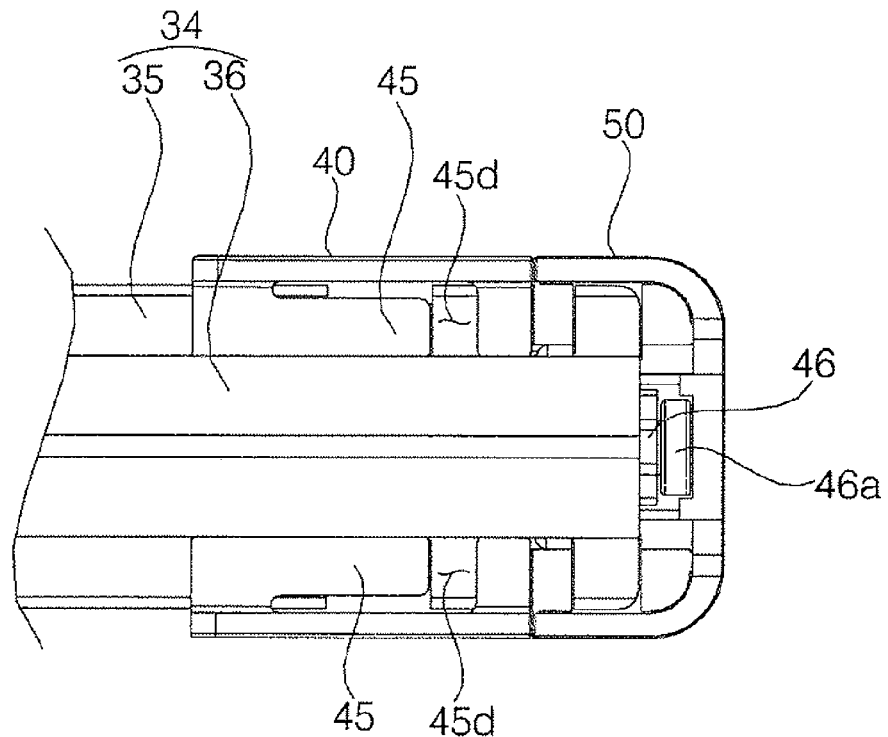
[Fig. 21]
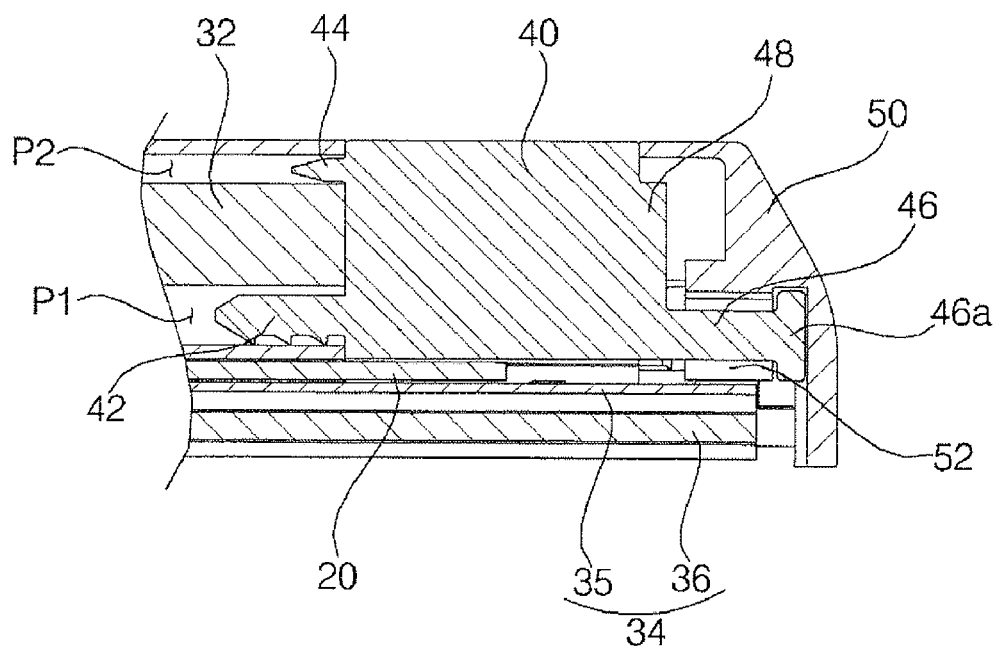

WINDSHIELD WIPER ASSEMBLY

TECHNICAL FIELD

The present invention relates to a windshield wiper assembly, and more particularly to a windshield wiper assembly that is capable of wiping foreign matter from a vehicle.

BACKGROUND ART

In general, a vehicle is equipped with a windshield, which is made of glass, for preventing foreign matter, such as wind, rain, snow, or dust, from being introduced into the vehicle while securing a visual field.

The windshield is provided at the front of the vehicle, and a windshield wiper assembly, which is configured to wipe foreign matter, such as rain, snow, or dust, from the windshield, is mounted to the windshield.

The windshield wiper assembly includes a driving arm rotatably installed in the vehicle and a wiper configured to turn along the surface of the windshield in response to the operation of the driving arm. During the turning of the wiper, a blade or a squeegee provided at the wiper wipes moisture or foreign matter from the surface of the windshield.

DISCLOSURE OF INVENTION

Technical Problem

Therefore, the present invention has been made in view of the above problems, and it is an object of the present invention to provide a windshield wiper assembly that is capable of securely holding a spoiler, thereby preventing poor operation of a wiping rubber member.

Technical problems to be solved by the present invention are not limited to the aforementioned technical problem, and other technical problems will be clearly understood by those skilled in the art to which the present invention pertains in view of the following description.

Solution to Problem

In accordance with an aspect of the present invention, the above and other objects can be accomplished by the provision of a windshield wiper assembly including a bendable elastic member, a wiping rubber member configured to contact a windshield of a vehicle, a spoiler including a base part for supporting the wiping rubber member and a deflection part configured to be deformed by pressure of wind applied while the vehicle is being driven, the base part and the deflecting part being integrally formed, the spoiler being supported by the elastic member, an outer plug coupled to one end of the spoiler, the base part extending through the outer plug, and an end cap coupled to the outer plug, an end of the base part that extends through the outer plug being inserted into the end cap.

Details of other embodiments are included in the detailed description of the preferred embodiment and the accompanying drawings.

Advantageous Effects of Invention

In a windshield wiper assembly according to the present invention, an outer plug and an end cap securely hold a portion of a base part located at one end of a spoiler. As a result, a wiping rubber member, which wipes a windshield, is prevented from moving relative to the base part, whereby the wiping efficiency of the wiping rubber member is improved.

The effects of the present invention are not limited to the above-described effects. It is obvious to those skilled in the art that other different effects may be clearly understood from the accompanying claims.

BRIEF DESCRIPTION OF DRAWINGS

The above and other objects, features and other advantages of the present invention will be more clearly understood from the following detailed description taken in conjunction with the accompanying drawings, in which:

FIG. 1 is an assembled perspective view showing a windshield wiper assembly according to an embodiment of the present invention;

FIG. 2 is an exploded perspective view showing the windshield wiper assembly according to the embodiment of the present invention;

FIG. 3 is a front perspective view showing a state in which an elastic member, a spoiler, and an adaptor holder bracket shown in FIG. 2 are coupled to one another;

FIG. 4 is a view showing a middle portion of the spoiler shown in FIG. 3 in the longitudinal direction of the spoiler;

FIG. 5 is a view showing opposite ends of the spoiler shown in FIG. 3;

FIG. 6 is a rear perspective view showing a state in which the elastic member, the spoiler, and the adaptor holder bracket shown in FIG. 2 are coupled to one another;

FIG. 7 is a view showing the middle portion of the spoiler shown in FIG. 6 in the longitudinal direction of the spoiler;

FIG. 8A is a sectional view taken along line I-I of FIG. 1;

FIG. 8B is a view showing a state in which the deflection part is deformed by the pressure of wind applied while a vehicle is being driven;

FIG. 9 is a view showing an H type adaptor holder and an H type adaptor installed in the structure shown in FIG. 1;

FIG. 10 is an exploded perspective view of FIG. 9;

FIG. 11 is a view showing a B type adaptor holder and a B type adaptor installed in the structure shown in FIG. 1;

FIG. 12 is an exploded perspective view of FIG. 11;

FIG. 13 is a view showing a B type adaptor holder and a C type adaptor installed in the structure shown in FIG. 1;

FIG. 14 is an exploded perspective view of FIG. 13;

FIGS. 15A to 15C are views showing an outer plug of the windshield wiper assembly according to the embodiment of the present invention;

FIGS. 16A to 16C are views showing an end cap of the windshield wiper assembly according to the embodiment of the present invention;

FIGS. 17A to 17C are views showing an inner plug of the windshield wiper assembly according to the embodiment of the present invention;

FIG. 18 is a view showing a state of the windshield wiper assembly according to the embodiment of the present invention before the outer plug and the end cap are coupled to each other;

FIG. 19 is a view showing a state of the windshield wiper assembly according to the embodiment of the present invention after the outer plug and the end cap are coupled to each other;

FIG. 20 is a bottom view showing the opposite ends of the spoiler shown in FIG. 1; and FIG. 21 is a cross-sectional view showing the opposite ends of the spoiler shown in FIG. 1.

BEST MODE FOR CARRYING OUT THE INVENTION

Reference will now be made in detail to embodiments, examples of which are illustrated in the accompanying drawings. However, the present invention may be embodied in many different forms and should not be construed as limited to the embodiments set forth herein. Rather, these embodiments are provided so that the present invention will be thorough and complete, and will fully convey the scope of the present invention to those skilled in the art. The present invention is defined only by the categories of the claims. Wherever possible, the same reference numbers will be used throughout the drawings to refer to the same or like parts.

Hereinafter, a windshield wiper assembly according to an embodiment of the present invention will be described in detail with reference to the accompanying drawings.

FIG. 1 is an assembled perspective view showing a windshield wiper assembly according to an embodiment of the present invention, FIG. 2 is an exploded perspective view showing the windshield wiper assembly according to the embodiment of the present invention, FIG. 3 is a front perspective view showing a state in which an elastic member, a spoiler, and an adaptor holder bracket shown in FIG. 2 are coupled to one another, FIG. 4 is a view showing a middle portion of the spoiler shown in FIG. 3 in the longitudinal direction thereof, FIG. 5 is a view showing opposite ends of the spoiler shown in FIG. 3, FIG. 6 is a rear perspective view showing a state in which the elastic member, the spoiler, and the adaptor holder bracket shown in FIG. 2 are coupled to one another, and FIG. 7 is a view showing the middle portion of the spoiler shown in FIG. 6 in the longitudinal direction thereof.

Referring to FIGS. 1 to 7, a windshield wiper assembly 100 according to an embodiment of the present invention includes an adaptor holder bracket 10, an elastic member 20, a spoiler 30, outer plugs 40, end caps 50, inner plugs 60, and a wiping rubber member 70.

The adaptor holder bracket 10 is coupled to a middle portion of the elastic member 20 in the longitudinal direction of the elastic member 20 to support the elastic member 20. Three forcible fitting type coupling ends 12, which are configured to be coupled to the elastic member 20, are formed on each side of the adaptor holder bracket 10. That is, the opposite sides of the elastic member 20 are caught by the forcible fitting type coupling ends 12 such that the elastic member 20 is coupled with the adaptor holder bracket 10.

A hook catching ring 14 is formed at each end of the adaptor holder bracket 10. Various types of adapter holders 80a and 80b (see FIGS. 9 to 14) are coupled to the hook catching rings 14. Adaptors 90a, 90b, and 90c (see FIGS. 9 to 14), which are connected to a driving arm equipped in a vehicle, are coupled to the adapter holders 80a and 80b.

The elastic member 20 is formed in the shape of a plate spring that extends in the leftward and rightward direction when viewing the drawings. The elastic member 20 is inserted into the spoiler 30 in the longitudinal direction of the spoiler 30. That is, one end of the elastic member 20 is inserted into the spoiler 30 from the left to the right of the spoiler 30 or from the right to the left of the spoiler 30, when viewing the drawings, so as to support the spoiler 30.

The elastic member 20 includes a straight part 22 formed at a middle portion thereof, at which the adaptor holder bracket 10 is coupled to the elastic member 20, in the longitudinal direction of the elastic member 20 and curved parts 24 extending from opposite ends of the straight part 22 in the longitudinal direction of the elastic member 20.

The straight part 22 extends straight. The straight part 22 is provided with three positioning recesses 23 for positioning the adaptor holder bracket 10 when the adaptor holder bracket 10 is coupled to the straight part 22. The adaptor holder bracket 10 may be provided on the lower surface thereof with positioning protrusions (not shown), which are configured to be inserted into the positioning recesses 23. In a state in which the adaptor holder bracket 10 is coupled with the elastic member 20, the positioning protrusions remain inserted into the positioning recesses 23, with the result that the elastic member 20 is prevented from moving in the longitudinal direction of the elastic member 20.

Each of the curved parts 24 is curved downward at a predetermined curvature to provide elastic force to the spoiler 30 such that the wiping rubber member 70 comes into tight contact with a windshield of the vehicle.

The spoiler 30 includes a relatively soft deflection part 32, which is configured to be deformed by the pressure of wind applied to the soft deflection part 32 while the vehicle is being driven, and a relatively hard base part 34 for supporting the wiping rubber member 70 without being deformed even when the deflection part 32 is deformed.

The deflection part 32 and the base part 34 are integrally formed. In a state in which the elastic member 20 is inserted into the spoiler 30, the portion of the spoiler 30 above the elastic member 20 is the deflection part 32, and the portion of the spoiler 30 under the elastic member 20 is the base part 34.

The base part 34 includes a body 35, integrally formed with each side of the deflection part 32 such that the elastic member 20 comes into contact with the upper surface of the body 35, and a retainer 36, formed on the lower surface of the body 35, which is opposite to the upper surface of the body 35, with which the elastic member 20 comes into contact, in a protruding fashion to support the wiping rubber member 70.

Only the base part 34, not the deflection part 32, is formed, at the middle portion and the opposite ends of the spoiler 30 in the longitudinal direction of the spoiler 30. That is, a space in which the deflection part 32 is not present, i.e. a first recess 30a, is defined in the middle portion of the spoiler 30 in the longitudinal direction of the spoiler 30 above the base part 34, and a space in which the deflection part 32 is not present, i.e. a second recess 30b, is defined in each end of the spoiler 30 in the longitudinal direction of the spoiler 30 above the base part 34.

In a state in which the elastic member is inserted into the spoiler 30, the straight part 22 is disposed in the first recess 30a, and outer ends of the curved parts 24 are disposed in the second recesses 30b.

Three installation recesses 31 are formed in each side of the portion of the base part 34 which is located in the first recess 30a. The installation recesses 31 are formed to have a size such that the forcible fitting type coupling ends 12, which are formed at the adaptor holder bracket 10, can be inserted into the installation recesses 31. Consequently, the forcible fitting type coupling ends 12 are inserted into the installation recesses 31. That is, when the forcible fitting type coupling ends 12 are inserted into the installation recesses 31, a worker may recognize that the adaptor holder bracket 10 is coupled to the spoiler 30 at the correct position.

In addition, the middle installation recesses 31 are formed so as to be longer than the other installation recesses 31.

When the inner plugs 60 are coupled to the spoiler 30, grip legs 68, which are formed on the inner plugs 60, may be inserted into the middle installation recesses 31, and then the inner plugs 60 may be slid to the coupling positions.

The outer plugs 40 are coupled to the opposite ends of the spoiler 30. That is, the outer plugs 40 are brought into tight contact with the deflection parts 32, which are formed at the opposite ends of the spoiler 30, such that the ends of the base part 34 located in the second recesses 30b are inserted into the outer plugs 40. As a result, the outer plugs 40 may be coupled to the opposite ends of the spoiler 30.

A first protruding end 42 and a second protruding end 44, which are inserted into and coupled to the deflection part 32 of the spoiler 30, are formed on each of the outer plugs 40. In addition, a third protruding end 46 and a fourth protruding end 48, which are inserted into and coupled to a corresponding one of the end caps 50, are formed on the outer end of each of the outer plugs 40, which is opposite to the inner end of each of the outer plugs 40, on which the first protruding end 42 and the second protruding end 44 are formed.

The portion of the base part 34 that is formed at each end of the spoiler 30 is formed so as to be longer than a corresponding one of the outer plugs 40. Consequently, the ends of the base part 34 are inserted into the outer plugs 40, extend through the outer plugs 40, and then protrude from the outer plugs 40. The ends of the base part 34 that protrude from the outer plugs 40 are inserted into the end caps 50.

Stopper holes 33 are formed in each side of the portion of the base part 34 formed at each end of the spoiler 30. Specifically, a pair of stopper holes 33 are formed in each side of the portion of the base part 34 formed at each end of the spoiler 30. Stopper ends 45c (see FIG. 18) formed inside each of the outer plugs 40 are caught in the stopper holes 33.

Each of the end caps 50 is coupled to a corresponding one of the outer plugs 40 through the third protruding end 46 and the fourth protruding end 48 formed at the corresponding outer plug 40. The end of the base part 34 located in each of the second recesses 30b is formed so as to be longer than a corresponding one of the outer plugs 40. In a state in which the outer plugs 40 are coupled to the deflection part 32 of the spoiler 30, therefore, the ends of the base part 34 located in the second recesses 30b are inserted into the outer plugs 40, extend through the outer plugs 40, and are then inserted into the end caps 50.

The inner plugs 60 are coupled to the portions of the deflection part 32 corresponding to the opposite ends of the first recess 30a. A fifth protruding end 62 and a sixth protruding end 64, which are inserted into the deflection part 32 and are then coupled to the deflection part 32, are formed on each of the inner plugs 60.

The wiping rubber member 70 is configured to contact the windshield of the vehicle. When the windshield wiper assembly according to the embodiment of the present invention is operated, the wiping rubber member 70 wipes rainwater and foreign matter from the windshield while turning along the curved surface of the windshield. The wiping rubber member 70 may be made of a flexible material, such as rubber or synthetic resin, which can be deformed by external force.

FIG. 8A is a sectional view taken along line I-I of FIG. 1, and FIG. 8B is a view showing a state in which the deflection part is deformed by the pressure of wind applied while the vehicle is being driven.

The spoiler 30 is provided with an elastic member through hole C, which is defined between the deflection part 32 and the retainer 36. The elastic member may be inserted into the spoiler 30 through the elastic member through hole C in the longitudinal direction of the spoiler 30. In a state in which the elastic member is inserted into the spoiler 30 through the elastic member through hole C, the portion of the spoiler 30 above the elastic member 20 is the deflection part 32, and the portion of the spoiler 30 beneath the elastic member 20 is the base part 34.

Since the deflection part 32 is made of a soft material, the deflection part 32 may be easily deformed by the pressure of wind. In addition, the retainer 36 is harder than the deflection part 32 in order to strongly fix the upper end of the wiping rubber member 70. While the windshield wiper assembly according to the embodiment of the present invention is turning, therefore, the wiping rubber member 70 is not separated from the spoiler 30 even when the wiping rubber member 70 is biased.

The base part 34 of the spoiler 30 includes a body 35, on the upper surface of which the elastic member 20 is disposed in a contact state, and a retainer 36 formed on the lower surface of the body 35 in a protruding fashion to support the wiping rubber member 70.

The retainer 36 is provided with a pair of claws 36a, which are bent inward from lower ends of the retainer 36. A space is defined between the claws 36a and the body 35. The upper end 71 of the wiping rubber member 70 may be inserted into the space such that the upper end 71 of the wiping rubber member 70 can be supported by the claws 36a. The distance between the claws 36a may be less than at least the width of the upper end 71 of the wiping rubber member 70 such that the upper end 71 of the wiping rubber member 70 is prevented from being separated from the space.

In addition, the retainer 36 may be provided with support ribs 36b, which extend from the outsides of the claws 36a in the lateral direction. Support ends 73, having a predetermined width, formed at the lower side of the upper end 71 of the wiping rubber member 70, are supported by the support ribs 36b. The claws 36a and the support ribs 36b are elements that constitute the base part 34. Consequently, the claws 36a and the support ribs 36b may be made of the same hard material as the base part 34.

The support ribs 36b are formed so as to be wider than the width of the support ends 73 of the wiping rubber member 70. When the wiping rubber member 70 is bent during the turning motion of the wiping rubber member 70 along the surface of the windshield under the base part 34, therefore, the support ends 73 of the wiping rubber member 70 are supported by the support ribs 36b, thereby achieving stable and efficient wiping effects.

In addition to the upper end 71 and the support ends 73, the wiping rubber member 70 further includes a blade 75, which is a part that substantially comes into tight contact with the windshield, provided at the lower side of the support ends 73.

Meanwhile, the section from the upper surface F1 of the body 35 to the lower surface F2 of the deflection part 32 corresponds to the thickness of the elastic member 20. In this section, the spoiler 30 is securely supported by the elastic member, which is located in the elastic member through hole C, with the result that the spoiler 30 is hardly deformed, and is thus stable.

In particular, while the elastic member 20 turns along the surface of the windshield, the elastic member 20 is elastically deformed corresponding to the curvature of the windshield. Such deformation is caused due to a variation in the curvature of the windshield, mainly in the longitudinal direction.

Since the elastic member 20 is hardly deformed in the horizontal direction even if the deflection part 32, which is made of a soft material, located at the upper side of the elastic member through hole C in the spoiler 30, is somewhat deformed due to the deformation of the elastic member 20, opposite sidewalls 37a and 37b that define opposite side surfaces F3 and F4 of the elastic member through hole C are very resistant to external force. The sidewalls 37a and 37b have inner surfaces that define the side surfaces F3 and F4 of the elastic member through hole C and outer surfaces that define the external appearance of the spoiler 30.

Hereinafter, the lower ends of the sidewalls 37a and 37b are defined so as to be located at a height h1 corresponding to the upper surface F1 of the body 35, and the upper ends of the sidewalls 37a and 37b are defined so as to be located at a height h2 corresponding to the lower surface F2 of the deflection part 32. The boundary S between different materials, i.e. the soft material and the hard material, may be formed at an arbitrary point located between the lower ends and the upper ends of the sidewalls 37a and 37b.

A middle part 37 is a portion that defines the lower surface F1, the upper surface F2, and the opposite side surfaces F3 and F4 of the elastic member through hole C. The middle part 37 includes the lower end of the deflection part 32 and the upper end of the base part 34. The middle part 37 includes the body 35 of the hard base part 34, which defines the lower surface F1, the lower end of the deflection part 32, which defines the upper surface F2, and the sidewalls 37a and 37b, which respectively define the opposite side surfaces F3 and F4. As shown in cross section, the elastic member through hole C defined by the middle part 37 is surrounded by the lower end of the deflection part 32, the body 35 of the base part 34, and the opposite sidewalls 37a and 37b in a closed state.

In the structure in which the boundary S between the different materials is formed on the opposite sidewalls 37a and 37b, it is possible to provide stability with respect to the joint between the different materials and to prevent the different materials from being separated from each other. Since the different materials have different deformation extents, it is necessary to keep the shearing forces applied to the joint between the different materials in opposite directions uniform. If the boundary between the deflection part 32 and the base part 34 is located at the upper side of the elastic member through hole C, a strong shearing force is generated between the deflection part 32 and the base part 34 due to the variation in the curvature of the elastic member 20, the bias of the wiping rubber member 70 depending upon a change in the direction in which the wiping rubber member 70 is moved, etc. In particular, since the deflection part 32 is tilted to a uniform direction due to the pressure of wind while the vehicle is being driven, whereas the direction in which the windshield wiper assembly 100 according to the embodiment of the present invention turns is repeatedly changed by the driving arm, the shearing force that is applied to the joint between the different materials may be so strong that the different materials can be separated from each other when the turning direction of the windshield wiper assembly is changed.

In the windshield wiper assembly 100 according to the embodiment of the present invention, on the other hand, the boundary S between the deflection part 32 and the base part 34 is located in the region which is supported by the side surface of the elastic member 20 and is thus very stable against external force, with the result that the shearing force applied to the joint between the deflection part 32 and the base part 34 is reduced, thereby preventing the deflection part 32 and the base part 34 from being separated from each other.

Meanwhile, as shown in FIG. 8A, the deflection part 32 may include a pair of wind pressure application surfaces 32a and 32b, which are arranged symmetrically on the cross section across the longitudinal direction. FIG. 8A shows the wind pressure application surfaces 32a and 32b, which are arranged symmetrically with respect to a middle line M that horizontally divides the spoiler 30 into two parts. Nations may have different regulations for vehicles. In some nations, the driving arm must be turnably installed in the left region from the turning center. In some nations, the driving arm must be turnably installed in the right region from the turning center. Since the spoiler 30 has the wind pressure application surfaces 32a and 32b, which are arranged symmetrically with respect to the middle line M, however, the spoiler 30 may be mounted in various kinds of vehicles regardless of the above-mentioned regulations. Here, the middle line M that horizontally divides the spoiler 30 into two parts has something in common with a straight line passing through the center of a through hole P1 and the center of a through hole P2. That is, the deflection part 32 is symmetric with respect to the straight line passing through the center of the through hole P1 and the center of the through hole P2.

The deflection part 32 may be provided with a through hole P1 (which may have the same construction as a first fixing hole and a fifth fixing hole, which will be described hereinafter), which extends between the wind pressure application surfaces 32a and 32b in the longitudinal direction. The amount of material for the deflection part 32 may be reduced by the provision of the through hole P1. In addition, the through hole P1, which has a circular structure when viewed in cross section, structurally stabilizes the deflection part 32. When the deflection part 32 is deformed by external force, the elasticity of the deflection part 32 is increased by the provision of the through hole P1. When the external force applied to the deflection part 32 is removed, the deflection part 32 can smoothly return to the original state thereof by the provision of the through hole P1.

The deflection part 32 may include a protrusion 32c formed at the upper end thereof and extending in the longitudinal direction, the protrusion 32c having an outer form that constitutes part of a circle on the cross section across the longitudinal direction, a through hole P2 (which may have the same construction as a second fixing hole and a sixth fixing hole, which will be described hereinafter), which is formed in the protrusion 32c while extending in the longitudinal direction, and a neck 32d extending downward from the outer surface of the protrusion 32c. The wind pressure application surfaces 32a and 32b may extend from the neck 32d.

The neck 32d may be configured such that the distance (hereinafter, the thickness) between a side surface 32e connected to one of the wind pressure application surfaces 32a and 32b, i.e. the wind pressure application surface 32a, and a side surface 32f connected to the other of the wind pressure application surfaces 32a and 32b, i.e. the wind pressure application surface 32b, is uniform. The outer diameter of the protrusion 32c may be greater than the thickness of the neck 32d.

The spoiler 30 may be provided at the middle portion thereof with a section in which the deflection part 32 is not formed in order to define the first recess 30a, as described above. The base part 34 may be exposed in the middle portion of the spoiler 30, and the adaptor holder bracket 10 may be coupled to the body 35 of the base part 34.

In addition to the pressure applied from the driving arm while the vehicle is being driven at a low speed, the upper side wind receiving area, which is proportional to the length of a line A1 interconnecting the protrusion 32c and the lower end of the sidewall 37a, is greater than the lower side wind receiving area, which is proportional to the length of a line A3 interconnecting the lower end of the wiping rubber member 70 and the lower end of the sidewall 37a. As a result, the pressure applied to the upper side wind receiving area becomes higher than the pressure applied to the lower side wind receiving area, thereby preventing the wiping rubber member 70 from coming off the windshield.

Meanwhile, since the thin and long neck 32d of the spoiler 30 is bent backward while the vehicle is being driven at a high speed, the line A1 interconnecting the protrusion 32c and the lower end of the sidewall 37a is changed into a line A2, which is longer than the line A1. Consequently, the size of the upper side wind receiving area is further increased, thereby securely preventing the wiping rubber member 70 from coming off the windshield. That is, as the distance between the protrusion 32c and the lower end of the sidewall 37a is increased from A1 to A2, the length that is directly connected to the vertical component of the pressure applied to the upper side wind receiving area is greatly increased from B1 to B2, with the result that it is possible to securely prevent the wiping rubber member 70 from coming off the windshield. In this structure, it is possible to greatly increase the upper side wind receiving area on the wind pressure application surface 32a, to which the pressure of wind is applied, such that the upper side wind receiving area on the wind pressure application surface 32a is larger than the upper side wind receiving area on the wind pressure application surface 32b, which is opposite to the wind pressure application surface 32a, particularly even in a case in which the wind pressure application surfaces 32a and 32b are arranged symmetrically.

Meanwhile, the material for the protrusion 32c is decreased, and the weight of the protrusion 32c is reduced, since the protrusion 32c has the through hole P2 formed therein. In addition, the inside of the protrusion 32c is cylindrical. Consequently, the protrusion 32 is somewhat deformed by the pressure of wind applied while the vehicle is being driven at a high speed, with the result that the protrusion 32 may flexibly withstand external force. In particular, it is possible to distribute the stress applied to the connection between the protrusion 32c and the neck 32d, thereby improving the rigidity of the protrusion 32c.

In addition, since the vehicle is exposed to the outside air, the vehicle is affected by external environmental factors, such as weather, temperature, humidity, and a diurnal range. In a case in which the protrusion 32c has the through hole P2 formed therein, it is possible for the protrusion 32c to more flexibly withstand the contraction and expansion based on the external environment factors than in a case in which protrusion 32c has no through hole P2 formed therein, whereby the durability of the protrusion 32c is improved.

FIG. 9 is a view showing an H type adaptor holder and an H type adaptor installed in the structure shown in FIG. 1, FIG. 10 is an exploded perspective view of FIG. 9, FIG. 11 is a view showing a B type adaptor holder and a B type adaptor installed in the structure shown in FIG. 1, FIG. 12 is an exploded perspective view of FIG. 11, FIG. 13 is a view showing a B type adaptor holder and a C type adaptor installed in the structure shown in FIG. 1, and FIG. 14 is an exploded perspective view of FIG. 13.

Referring to FIGS. 9 to 14, the adaptor holder bracket 10 has a common structure configured such that various types of adaptor holders 80a and 80b can be coupled to the adaptor holder bracket 10. The windshield wiper assembly 100 according to the embodiment of the present invention turns along the curved surface of the windshield in response to the operation of the driving arm equipped in the vehicle. However, various types of driving arms are equipped in vehicles based on the specification of the vehicles.

Consequently, various types of adaptors 90a, 90b, and 90c, which are coupled to the driving arms, are provided based on the types of the driving arms, and various types of adaptor holders 80a and 80b, to which the adaptors 90a, 90b, and 90c are coupled, are provided based on the types of the adaptors 90a, 90b, and 90c.

The adaptor holder bracket 10 is provided at opposite ends thereof with hook catching rings 14, to which various types of adaptor holders 80a and 80b are coupled. The hook catching rings 14 may be bent in the shape of a ring such that the hook catching rings 14 can protrude upward from the opposite ends of the adaptor holder bracket 10.

The shape of the adaptor holders 80a and 80b is not particularly restricted so long as the adaptor holders 80a and 80b are coupled to the hook catching rings 14 to support the adaptor holder bracket 10. In addition, the shape of the adaptors 90a, 90b, and 90c is not particularly restricted so long as the adaptors 90a, 90b, and 90c are rotatably coupled to the adaptor holders 80a and 80b to enable the wiping rubber member 70 to turn along the curved surface of the windshield while rotating relative to the adaptor holders 80a and 80b while the driving arm is turning. A detailed description of the adaptor holders 80a and 80b and the adaptors 90a, 90b, and 90c will be omitted.

FIGS. 15A to 15C are views showing an outer plug of the windshield wiper assembly according to the embodiment of the present invention. Here, a first fixing hole and a fifth fixing hole, which may be understood to have the same construction as the through hole P1, which was described with reference to FIGS. 8A and 8B, are denoted by the same reference symbol P1 as the through hole P1, even if different names are used for easy understanding of the description. In addition, a second fixing hole and a sixth fixing hole, which may be understood to have the same construction as the through hole P2, are denoted by the same reference symbol P2 as the through hole P2, even if different names are used for easy understanding of the description.

Referring to FIGS. 15A to 15C, the outer plug 40 includes a first protruding end 42, which is inserted into a first fixing hole P1 formed in the deflection part 32, a second protruding end 44, which is inserted into a second fixing hole P2 formed in the deflection part 32, a pair of first guide pieces 41 configured to surround a portion of the outer surface of the deflection part 32, and a pair of guides 45 protruding to surround the lateral end of the base part 34.

The first protruding end 42 and the second protruding end 44 extend in the longitudinal direction so as to have a circular section. The first protruding end 42 and the second protruding end 44 are formed such that the tips of the first protruding end 42 and the second protruding end 44 are sharp so as to be easily inserted into the deflection part 32. The sectional area of the first protruding end 42 is greater than the sectional area of the second protruding end 44, and the length of the first protruding end 42 is greater than the length of the second protruding end 44.

A clinching protrusion 42a is formed on the outer surface of the first protruding end 42. In a state in which the first protruding end 42 is inserted into the first fixing hole P1, the first protruding end 42 is not easily separated from the first fixing hole P1 owing to the clinching protrusion 42a. Specifically, a plurality of clinching protrusions 42a may be formed on a portion of the outer surface of the first protruding end 42 such that the clinching protrusions 42a are spaced apart from each other.

The first guide pieces 41 are brought into contact with the opposite side surfaces of the deflection part 32 to securely hold the soft deflection part 32.

The guides 45 protrude from the inner surface of the outer plug 40 to form a first slot 45a and a second slot 45b in the outer plug 40. A horizontal space is defined between the guides 45. The second slot 45b is formed in the horizontal space. The first slot 45a is formed above the guides 45. Consequently, the second slot 45b extends to the lower side of the first slot 45a.

In a state in which the outer plug 40 is coupled to the spoiler 30, the body 35 of the base part 34 is inserted into the first slot 45a, and the opposite side surfaces of the retainer 36 of the base part 34 are inserted into the second slot 45b. When the retainer 36 is inserted into the second slot 45b, the opposite side surfaces of the retainer 36 come into tight contact with the guides 45, with the result that the retainer 36 is prevented from widening to the opposite sides. Consequently, the wiping rubber member 70 does not move in the retainer 36 in the longitudinal direction, and the wiping rubber member 70 is not separated from the retainer 36.

The upper side of the outer plug 40, which is located above the first slot 45a, is formed so as to have a shape corresponding to the deflection part 32 of the spoiler 30. In a state in which the outer plug 40 is coupled to the spoiler 30, therefore, no step is formed between the outer plug 40 and the deflection part 32.

The outer plug 40 is provided at the other surface thereof, which is opposite to the surface at which the first protruding end 42 and the second protruding end 44 are formed, with a third protruding end 46 and a fourth protruding end 48.

The third protruding end 46 extends in the longitudinal direction so as to have a circular section, and the fourth protruding end 48 extends in the upward and downward direction. The length of the third protruding end 46 is greater than the length of the fourth protruding end 48.

A first stopper 46a is formed at the tip of the third protruding end 46. When the end cap 50 moves from the outer plug 40 in the longitudinal direction, the first stopper 46a is caught in the end cap 50, with the result that the end cap 50 is prevented from moving from the outer plug 40 in the longitudinal direction, whereby the end cap 50 is not separated from the outer plug 40.

A second stopper 48a, which contacts the open lower side of a sliding coupling part 54 formed on the end cap 50, which will be described hereinafter, is formed at the lower end of the fourth protruding end 48.

FIGS. 16A to 16C are views showing an end cap of the windshield wiper assembly according to the embodiment of the present invention.

The end cap 50 is provided with a third slot 55a, into which the body 35 is inserted, which is formed at a position corresponding to the first slot 45a, which is formed in the outer plug 40. The lower side surface of the third slot 55a is open. When the base part 34 is inserted into the end cap 50 through the outer plug 40, therefore, the body 35 is inserted into the third slot 55a, and the retainer 36 is disposed in the open lower side of the third slot 55a.

An elastic catching part 52 and a sliding coupling part 54 are formed in the end cap 50. The elastic catching part 52 is formed at the upper side of the third slot 55a, and the sliding coupling part 54 is formed at the upper side of the elastic catching part 52.

The elastic catching part 52 is provided with a third fixing hole 52a, which is coupled to the outer plug 40, and the sliding coupling part 54 is provided with a fourth fixing hole 54a, which is coupled to the outer plug 40. The third protruding end 46 formed on the outer plug 40 is inserted into the third fixing hole 52a, and the fourth protruding end 48 is inserted into the fourth fixing hole 54a. As a result, the outer plug 40 and the end cap 50 are coupled to each other.

The lower side of the elastic catching part 52 is open, and the lower side of the sliding coupling part 54 is also open in the same direction as the direction in which the lower side of the elastic catching part 52 is open. In order to couple the end cap 50 to the outer plug 40, therefore, the end cap 50 is located higher than the outer plug 40, the third protruding end 46 is aligned with the open lower side of the elastic catching part 52, the fourth protruding end 48 is aligned with the open lower side of the sliding coupling part 54, and the end cap 50 is pushed downward. As a result, the third protruding end 46 is inserted into the third fixing hole 52a through the open lower side of the elastic catching part 52, and the fourth protruding end 48 is inserted into the fourth fixing hole 54a through the open lower side of the sliding coupling part 54, with the result that the outer plug 40 and the end cap 50 are coupled to each other. During the coupling of the outer plug 40 and the end cap 50, as described above, the open lower side of the sliding coupling part 54 comes into contact with the second stopper 48a formed at the outer plug 40, with the result that the end cap 50 is prevented from moving further downward. That is, the second stopper 48a restrains the position at which the outer plug 40 and the end cap 50 are coupled to each other.

In a state in which the outer plug 40 and the end cap 50 are coupled to each other, as described above, the first stopper 46a, formed at the third protruding end 46 of the outer plug 40, is caught by the end of the elastic catching part 52, with the result that the third protruding end 46 is prevented from being separated from the third fixing hole 52a in the longitudinal direction. Consequently, the end cap 50 is prevented from moving from the outer plug 40 in the longitudinal direction and thus from being separated from the outer plug 40.

Meanwhile, the end cap 50 is provided with a pair of second guide pieces 51 configured to surround a portion of the outer surface of the part of the outer plug 40 having a shape corresponding to the deflection part 32. The second guide pieces 51 are brought into contact with the opposite side surfaces of the outer plug 40 so as to hold the outer plug 40 such that the end cap 50 is prevented from moving from the outer plug 40 in the longitudinal direction.

FIGS. 17A to 17C are views showing an inner plug of the windshield wiper assembly according to the embodiment of the present invention.

Referring to FIGS. 17A to 17C, the inner plug 60 includes a fifth protruding end 62, which is inserted into a fifth fixing hole P1 formed in the deflection part 32, a sixth protruding end 64, which is inserted into a sixth fixing hole P2 formed in the deflection part 32, a pair of third guide pieces 61 configured to surround a portion of the outer surface of the deflection part 32, and a pair of grip legs 68 bent to surround the lateral end of the base part 34.

The fifth protruding end 62 and the sixth protruding end 64 extend in the longitudinal direction so as to have a circular section. The fifth protruding end 62 and the sixth protruding end 64 are formed such that the tips of the fifth protruding end 62 and the sixth protruding end 64 are sharp so as to be easily inserted into the deflection part 32. The sectional area of the fifth protruding end 62 is greater than the sectional area of the sixth protruding end 64, and the length of the fifth protruding end 62 is greater than the length of the sixth protruding end 64.

A clinching protrusion 62a is formed on the outer surface of the fifth protruding end 62. In a state in which the fifth protruding end 62 is inserted into the fifth fixing hole P1, the fifth protruding end 62 is not easily separated from the fifth fixing hole P1 owing to the clinching protrusion 62a. Specifically, a plurality of clinching protrusions 62a may be formed on a portion of the outer surface of the fifth protruding end 62 such that the clinching protrusions 62a are spaced apart from each other.

The third guide pieces 61 are brought into contact with the opposite side surfaces of the deflection part 32 to securely hold the soft deflection part 32.

The grip legs 68 are bent downward from the lower end of the inner plug 60 to form a fourth slot 68a and a fifth slot 68b in the inner plug 60. A horizontal space is defined between the grip legs 68. The fifth slot 68b is formed in the horizontal space. The fourth slot 68a is formed above the grip legs 68. Consequently, the fifth slot 68b extends to the lower side of the first slot 45a.

In a state in which the inner plug 60 is coupled to the spoiler 30, the body 35 of the base part 34 is inserted into the fourth slot 68a, and the opposite side surfaces of the retainer 36 of the base part 34 are inserted into the fifth slot 68b. When the retainer 36 is inserted into the fifth slot 68b, the opposite side surfaces of the retainer 36 come into tight contact with the grip legs 68, with the result that the retainer 36 is prevented from widening to the opposite sides. Consequently, the wiping rubber member 70 does not move in the retainer 36 in the longitudinal direction, and the wiping rubber member 70 is not separated from the retainer 36.

The upper side of the inner plug 60, which is located above the fourth slot 68a, is formed so as to have a shape corresponding to the deflection part 32 of the spoiler 30. In a state in which the inner plug 60 is coupled to the spoiler 30, therefore, no step is formed between the inner plug 60 and the deflection part 32.

Installation recesses 31, which are cut outward in the lateral direction, are formed in the body 35 of the base part 34, which is located in the first recess 30a. The middle one of the installation recesses 31 is formed so as to have a size such that the grip legs 68 can be inserted into the middle installation recess 31. When the grip legs 68 are inserted into the middle installation recess 31 from above, and then the inner plug 60 is slid in the longitudinal direction, the body 35 is inserted into the fourth slot 68a, and the opposite side surfaces of the retainer 36 are inserted into the fifth slot 68b.

That is, the inner plugs 60 move from the upper side to the lower side of the first recess 30a, are inserted into the base part 34 through the installation recesses 31, and are slid toward one end of the first recess 30a and the other end of the first recess 30a in the longitudinal direction of the spoiler 30 while surrounding the lateral end of the base part 34. As a result, the fifth protruding end 62 and the sixth protruding end 64 are fitted into the fifth fixing hole P1 and the sixth fixing hole P2.

When the inner plugs 60 are fitted into the opposite ends of the first recess 30a, the inner plugs 60 securely hold the soft deflection part 32 and the hard retainer 36, as described above. In addition, the inner plugs 60 clearly partition the first recess 30a, in which the adapter assembly is coupled, and the deflection part 32 of the spoiler 30 from each other.

FIG. 18 is a view showing a state of the windshield wiper assembly according to the embodiment of the present invention before the outer plug and the end cap are coupled to each other, FIG. 19 is a view showing a state of the windshield wiper assembly according to the embodiment of the present invention after the outer plug and the end cap are coupled to each other, FIG. 20 is a bottom view showing the opposite ends of the spoiler shown in FIG. 1, and FIG. 21 is a cross-sectional view showing the opposite ends of the spoiler shown in FIG. 1.

Referring to FIGS. 18 to 21, in order to couple the end cap 50 to the outer plug 40, as described above, the end cap 50 is located higher than the outer plug 40, the third protruding end 46 is aligned with the open lower side of the elastic catching part 52, the fourth protruding end 48 is aligned with the open lower side of the sliding coupling part 54, and the end cap 50 is pushed downward. As a result, the third protruding end 46 is inserted into the third fixing hole 52a through the open lower side of the elastic catching part 52, and the fourth protruding end 48 is inserted into the fourth fixing hole 54a through the open lower side of the sliding coupling part 54, with the result that the outer plug 40 and the end cap 50 are coupled to each other.

When the outer plug 40 and the end cap 50 are coupled to each end of the spoiler 30, the base part 34, formed at each end of the spoiler 30, is inserted into the end cap 50 through the outer plug 40. At this time, the end of the elastic member 20 is not inserted into the end cap 50 but is disposed in the outer plug 40.

The body 35 of the base part 34, formed at each end of the spoiler 30, is inserted into the first slot 45a, formed in the outer plug 40, and then protrude from the outer plug 40. The end of the elastic member 20 is inserted into the first slot 45a and is disposed in the outer plug 40.

The stopper ends 45c, which protrude toward the first slot 45a, are formed at the guides 45, which are formed at the outer plug 40. The stopper ends 45c are caught in the stopper holes 33 formed in the body 35, which is inserted into the first slot 45a. Slits 45d are formed in the respective guides 45 such that the stopper ends 45c are elastically caught in the stopper holes 33 when the body 35 is inserted into the first slot 45a.

When the deflection part 32 is deformed by the pressure of wind that is applied to the deflection part 32 while the vehicle is being driven, the curved parts 24 of the elastic member 20 spread in response to the deformation of the deflection part 32, with the result that each end of the elastic member 20 pushes the portion of the base part 34 located at a corresponding end of the spoiler 30.

As each end of the elastic member 20 pushes the portion of the base part 34 located at a corresponding end of the spoiler 30, as described above, the retainer 36 of the base part 34, which is pushed by the elastic member 20, is widened to the opposite sides, whereby the force of the retainer 36 for holding the wiping rubber member 70 is reduced. As a result, the wiping rubber member 70 moves, which leads to poor operation of the wiping rubber member 70.

In the windshield wiper assembly 100 according to the embodiment of the present invention, however, only the end of the base part 34 is inserted into the end cap 50, and the end of the elastic member 20 is not inserted into the end cap 50 but is disposed in the outer plug 40. As a result, the end of the base part 34 is not pushed by the elastic member 20. In addition, movement of the wiping rubber member 70 is prevented, whereby it is possible to prevent poor operation of the wiping rubber member 70.

Of course, the opposite side surfaces of the retainer 36 of the base part 34, which is disposed in the outer plug 40, are brought into tight contact with the guides 45, formed in the outer plug 40. Consequently, the retainer 36 is prevented from being widened to the opposite sides even when the elastic member 20 pushes the base part 34.

In the windshield wiper assembly 100 according to the embodiment of the present invention, as described above, the outer plugs 40 and the end caps 50 securely hold the portions of the base part 34 located at the opposite ends of the spoiler 30. As a result, the wiping rubber member 70, which wipes the windshield, is prevented from moving relative to the base part 34, whereby the wiping efficiency of the wiping rubber member 70 is improved.

MODE FOR THE INVENTION

Various embodiments have been described in the best mode for carrying out the invention.

INDUSTRIAL APPLICABILITY

The present invention is applied to fields related to a windshield wiper assembly.

Those skilled in the art to which the present invention pertains will appreciate that the present invention may be carried out in other specific ways than those set forth herein without departing from the technical ideas and essential characteristics of the present invention. The above embodiments are therefore to be construed in all aspects as illustrative and not restrictive. The scope of the invention should be determined by the appended claims, not by the above description, and all changes and modifications derived from the meaning and scope of the appended claims and their equivalents are intended to be embraced therein.

The invention claimed is:

1. A windshield wiper assembly comprising:
   a bendable elastic member;
   a wiping rubber member configured to contact a windshield of a vehicle;
   a spoiler comprising a base part for supporting the wiping rubber member and a deflection part configured to be deformed by pressure of wind applied while the vehicle is being driven, the base part and the deflecting part being integrally formed, the spoiler being supported by the elastic member;
   an outer plug coupled to one end of the spoiler, the base part extending through the outer plug; and
   an end cap coupled to the outer plug, an end of the base part that extends through the outer plug being inserted into the end cap.

2. The windshield wiper assembly according to claim 1, wherein an end of the elastic member is disposed in the outer plug.

3. The windshield wiper assembly according to claim 1, wherein the base part comprises a body, integrally formed with each side of the deflection part such that the elastic member comes into contact with one surface of the body, and a retainer, formed on the other surface of the body, which is opposite to the one surface of the body, with which the elastic member comes into contact, in a protruding fashion to support the wiping rubber member, and the outer plug comprises a pair of guides defining a first slot, into which the body is inserted, and a second slot extending from the first slot such that opposite sides of the retainer are inserted into the second slot.

4. The windshield wiper assembly according to claim 3, wherein the elastic member is further inserted into the first slot.

5. The windshield wiper assembly according to claim 3, wherein the body, which is inserted into the first slot, is provided at opposite sides thereof with stopper holes, and each of the guides is provided with a stopper end, which is caught in a corresponding one of the stopper holes.

6. The windshield wiper assembly according to claim 5, wherein the guides are provided with slits such that the stopper ends are elastically caught in the stopper holes when the body is inserted into the first slot.

7. The windshield wiper assembly according to claim 3, wherein one side of the outer plug from the first slot is formed so as to have a shape corresponding to the deflection part.

8. The windshield wiper assembly according to claim 3, wherein the end cap is provided at a position thereof corresponding to the first slot with a third slot having a size such that the body can be inserted into the third slot.

9. The windshield wiper assembly according to claim 1, wherein the deflection part is provided with a first fixing hole and a second fixing hole, into which the outer plug is coupled, and the outer plug is provided with a first protruding end, which is inserted into and coupled to the first fixing hole, and a second protruding end, which is inserted into and coupled to the second fixing hole.

10. The windshield wiper assembly according to claim 9, wherein the first protruding end is provided on an outer surface thereof with a clinching protrusion.

11. The windshield wiper assembly according to claim 10, wherein the clinching protrusion is formed on a portion of the outer surface of the first protruding end in a circumferential direction.

12. The windshield wiper assembly according to claim 9, wherein the deflection part is symmetric with respect to a straight line passing through a center of the first fixing hole and a center of the second fixing hole.

13. The windshield wiper assembly according to claim 1, wherein the outer plug is provided with a pair of first guide pieces configured to be brought into contact with opposite side surfaces of the deflection part.

14. The windshield wiper assembly according to claim 1, wherein the end cap is provided with a third fixing hole and a fourth fixing hole, into which the outer plug is coupled, and the outer plug is provided with a third protruding end, which is inserted into and coupled to the third fixing hole, and a fourth protruding end, which is inserted into and coupled to the fourth fixing hole.

15. The windshield wiper assembly according to claim 14, wherein the end cap is provided with an elastic catching part, in which the third fixing hole is formed, one side of the elastic catching part is open, and the third protruding end is inserted into the third fixing hole through the open side of the elastic catching part.

16. The windshield wiper assembly according to claim 15, wherein the third protruding end is provided at a tip thereof with a first stopper configured to be brought into contact with an end of the elastic catching part to prevent the third protruding end from being separated from the third fixing hole.

17. The windshield wiper assembly according to claim 15, wherein the end cap is provided with a sliding coupling part, in which the fourth fixing hole is formed, one side of the sliding coupling part is open in the same direction as a direction in which the one side of the elastic catching part is open, and the fourth protruding end is inserted into the fourth fixing hole through the open side of the sliding coupling part.

18. The windshield wiper assembly according to claim 17, wherein the fourth protruding end is provided at a tip thereof with a second stopper configured to be brought into contact with the open side of the sliding coupling part.

19. The windshield wiper assembly according to claim 1, wherein the end cap is provided with a pair of second guide pieces configured to be brought into contact with opposite side surfaces of the outer plug.

20. The windshield wiper assembly according to claim 1, wherein the elastic member comprises:
    a straight part formed at a middle portion thereof in a longitudinal direction; and
    curved parts extending from opposite ends of the straight part in the longitudinal direction, each of the curved parts being curved at a predetermined curvature.

21. The windshield wiper assembly according to claim 1, wherein the deflection part is made of a soft material, and the base part is made of a harder material than the deflection part.

22. The windshield wiper assembly according to claim 1, wherein a longitudinal length of the elastic member is less than a longitudinal length of the base part.

* * * * *